(12) United States Patent
Priestman et al.

(10) Patent No.: US 8,640,536 B2
(45) Date of Patent: Feb. 4, 2014

(54) WATER DETECTION DEVICE (75) Inventors: Paul Priestman, London (GB); Mike Beadman, Royston (GB)

(73) Assignees: Priestman Goode (GB); Cambridge Design Partnership LLP (GB)

( * ) Notice: Subject to any disclaimer, the term of this patent is extended or adjusted under 35 U.S.C. 154(b) by 167 days.

(21) Appl. No.: 13/398,328

(22) Filed: Feb. 16, 2012

(65) Prior Publication Data
US 2012/0204986 A1  Aug. 16, 2012

Related U.S. Application Data (63) Continuation-in-part of application No. 12/478,892, filed on Jun. 5, 2009, now Pat. No. 8,196,463.

(30) Foreign Application Priority Data

Feb. 18, 2011  (GB) .................................. 1102813.1

(51) Int. Cl.
*G01F 17/00* (2006.01)

(52) U.S. Cl.
USPC ............................................................ 73/149

(58) Field of Classification Search
USPC ............................................................ 73/149
See application file for complete search history.

(56) References Cited

U.S. PATENT DOCUMENTS

| | | | | |
|---|---|---|---|---|
| 3,762,440 A * | 10/1973 | Bryant | .......................... | 137/551 |
| 3,763,504 A * | 10/1973 | Parsons | ............................ | 4/673 |
| 4,630,940 A * | 12/1986 | Ostertag et al. | ................ | 374/148 |
| 7,742,883 B2 * | 6/2010 | Dayton et al. | .................. | 702/45 |
| 8,292,125 B2 * | 10/2012 | Venugopalan | ................ | 222/158 |

* cited by examiner

*Primary Examiner* — Lisa Caputo
*Assistant Examiner* — Octavia D. Hollington
(74) *Attorney, Agent, or Firm* — Greenberg Traurig, LLP (57) ABSTRACT

A water sensing device for positioning at or over a waste outlet to provide an indication of the duration of water flow out of the outlet. The device may be configured as a plug or waste cover. The indication may be by light sources on the top surface of the device.

13 Claims, 15 Drawing Sheets

PLAN

SIDE

FRONT

WATER DETECTION DEVICE

RELATED APPLICATION INFORMATION

This application claims the benefit of and is a continuation-in-part of U.S. application Ser. No. 12/478,892, filed on Jun. 5, 2009, which application claimed the benefit of UK Application No. 0810239.4, filed on Jun. 5, 2008.

This application also claims the benefit of UK Application No. 1102813.1, filed on Feb. 18, 2011.

The disclosures of these related applications are incorporated herein by reference in their entirety.

BACKGROUND

This invention relates to a device for the detection of water and in particular to a low-cost device for monitoring water use.

The efficient use of water is an important environmental and economic consideration. Education of water consumers in relation to personal water usage (for example, using a sink or shower), and in particular wastage, may lead to a significant reduction in personal water usage.

Water users rarely have an appreciation of their personal usage of water, and in particular wastage of water due to taps running when the water is not being used, or extended showering. For example, it is common for a tap to be left running while a person brushes their teeth, even though no use is made of the water. Wastage of hot water is more significant than of cold water as not only is the water lost, but also the energy spent heating that water.

Although notifying the public about the importance of conserving water is partially successful, a greater awareness of the issue is required to create a significant change in consumer's behaviour.

There is therefore a need for an efficient means of highlighting water wastage to the public.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

There is provided a water monitoring device for positioning in a waste water outlet, comprising a top portion connected to a leg portion, the leg portion being configured to, in use, protrude down a waste water outlet in which the device is positioned, the leg portion comprising a water sensor positioned to detect water flowing down the waste water outlet, a timer connected to the water sensor and configured to be activated while water is detected by the water sensor, and an output connected to the timer, wherein the output is configured to provide an indication of the period over which water has been detected.

The device may be a plug and the top portion is configured to seal a waste water outlet in which the device is positioned.

The device is configured to supported by the leg portion such that it is movable between an open and a closed position.

The device may be a waste water outlet cover configured such that the device is supported in a waste water outlet by the leg portion and such that the top portion covers, but does not seal, the waste water outlet.

The output may be a visual display positioned in the top portion of the device.

The visual device may comprise a plurality of light emitting devices.

The light emitting device may be configured to illuminate sequentially.

The device may comprise a power supply device located in the leg portion.

The timer may be deactivated when water is not detected by the sensor, and wherein the period is the time during which the timer is activated.

The period may be the total time elapsed from the timer starting, including periods when water is not detected.

The sensor may be configured to detect hot water, but not cold water.

The timer may be activated only if the temperature of the water exceeds a predetermined temperature.

The period may be the time during which water over a predetermined temperature is detected.

Various optional features are described herein and in the claims of this application.

DESCRIPTION OF THE DRAWINGS

Embodiments of the present invention will now be further described, by way of example, with reference to the drawings, wherein:—

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although publishing information on water wastage brings the problem to people's attention, the current invention realises that a more effective way of causing consumers to reduce wastage would be to draw that wastage to the consumer's attention at the time the waste occurs. Accordingly, the current invention provides a device for indicating water usage. Various embodiments are described, for example for detecting water usage at the tap or at the outlet of the sink. An embodiment provides a device for positioning in a sink which detects and indicates water flow to a person using that sink. Embodiments of the invention may provide an indication of water volume flowing out of the sink, or may provide an alert each time certain quantities of water pass out of the sink. In order to encourage the user to fill a sink, rather than to work under a running tap and allow water to run away, the device's alerts may cease or change when it is detected that the sink is being filled.

A related, but different problem exists with showers. Showers are well known for utilising less water than a bath, but the public often fails to appreciate that a shower still uses a substantial quantity of water. In the examples discussed above with regard to sinks, the desired behaviour change to reduce water usage is to fill the sink rather than allowing the water to run away, whereas the desired behaviour change for showers is to reduce the period of usage.

Figure 1:
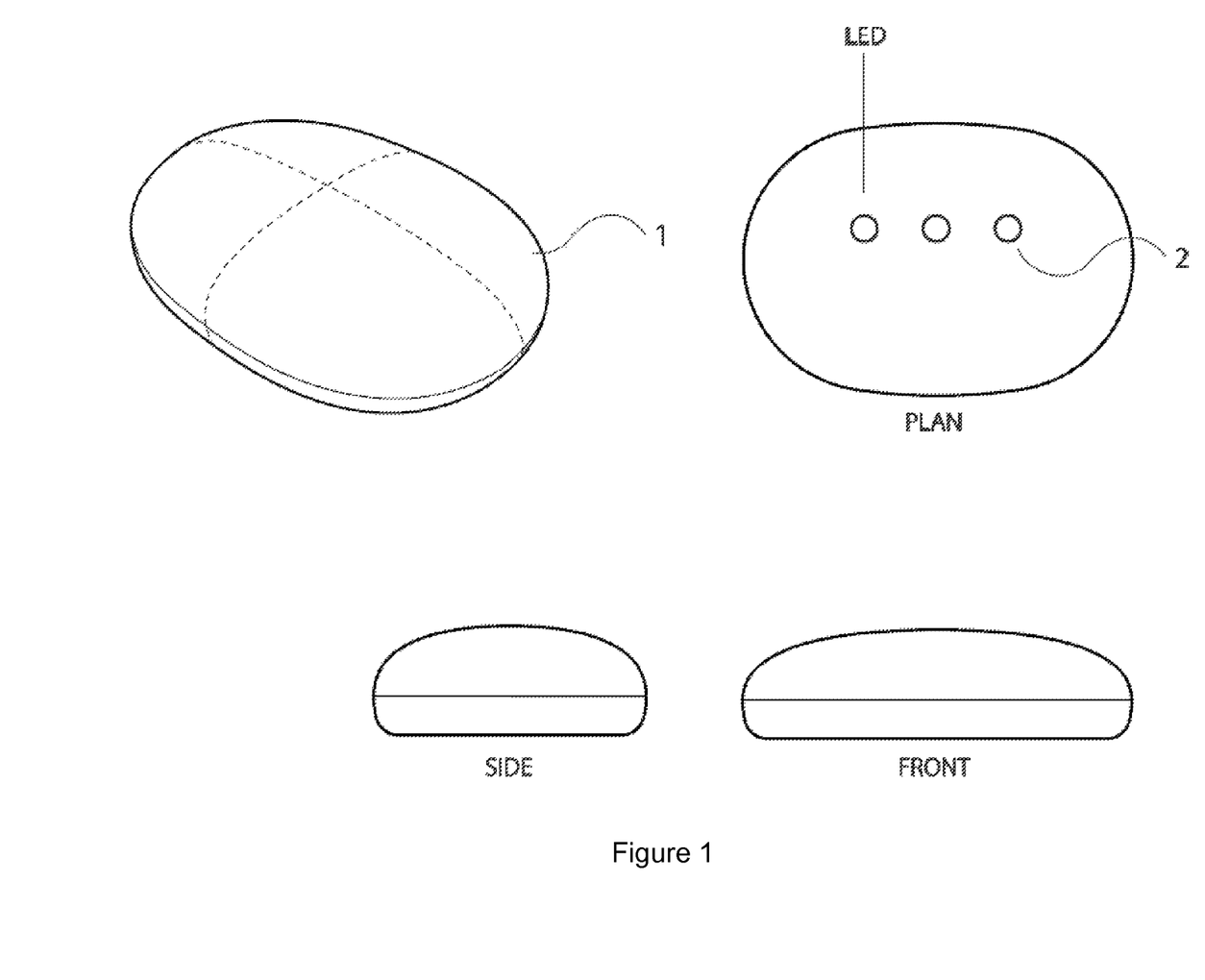
FIG. 1 shows an embodiment of a device configured to be positioned in a sink for measuring and indicating water volume.

FIG. 1 shows an embodiment of a device 1 for detecting water flow out of an outlet of a sink. The body of the device 1 is a generally smooth ovoid shape, such that the device will naturally slide to the lowest point in the sink in which it is disposed. The device is thus most likely to locate itself close to the outlet of the sink, thereby ensuring water flowing out of the sink is detected. A more spherical shape would allow the device to roll to the lowest point of the sink.

A liquid sensor is located on the device to detect liquid when it is in contact with the sensor. The sensor may be of any suitable type and particularly relevant options are discussed below. The device is provided with an indicator 2 for displaying an indication of water volume detected by the device. In the embodiment shown in FIG. 1, the display is a set of LEDs, but any suitable means may be utilised, for example a number display or bar-graph. In the embodiment shown in FIG. 1 each LED may be configured to illuminate in turn when a predefined volume of water is detected.

Figure 2:
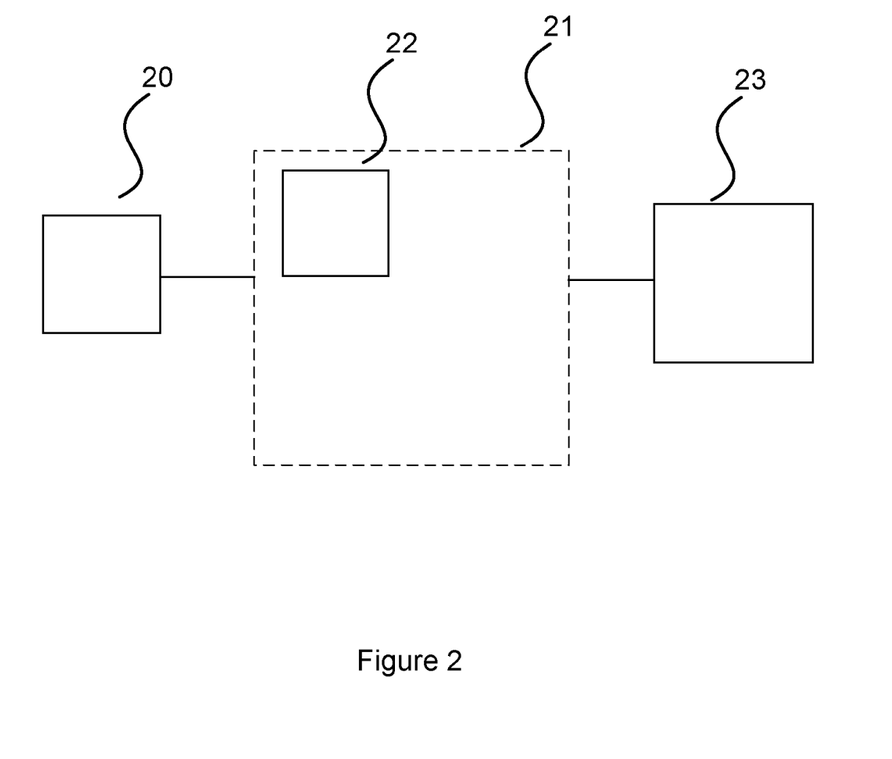
FIG. 2 shows a schematic diagram of a device for measuring water volume.

FIG. 2 shows a schematic diagram of a device shown in FIG. 1. The liquid sensor 20 is connected to a processing system 21 configured to respond to detection of liquid by the sensor 20. The processing system 21 comprises a counter 22 which counts while liquid is detected and thus provides an indication of the quantity of water that has been detected by the device. The counter 22 is started by the detection of water by the sensor 20, and stopped when water is no longer detected by the sensor 20. By calibration of the speed of counting to water flow-rate the counter 22 can be configured to provide an indication of water volume. A display 23 is connected to the processing system 21 and controlled to indicate the volume of liquid detected.

The processing system 21 may be provided by a microcontroller or similar processing device, suitably programmed to perform the required functions.

Alternatively, discrete logic devices may be utilised.

Figure 3:
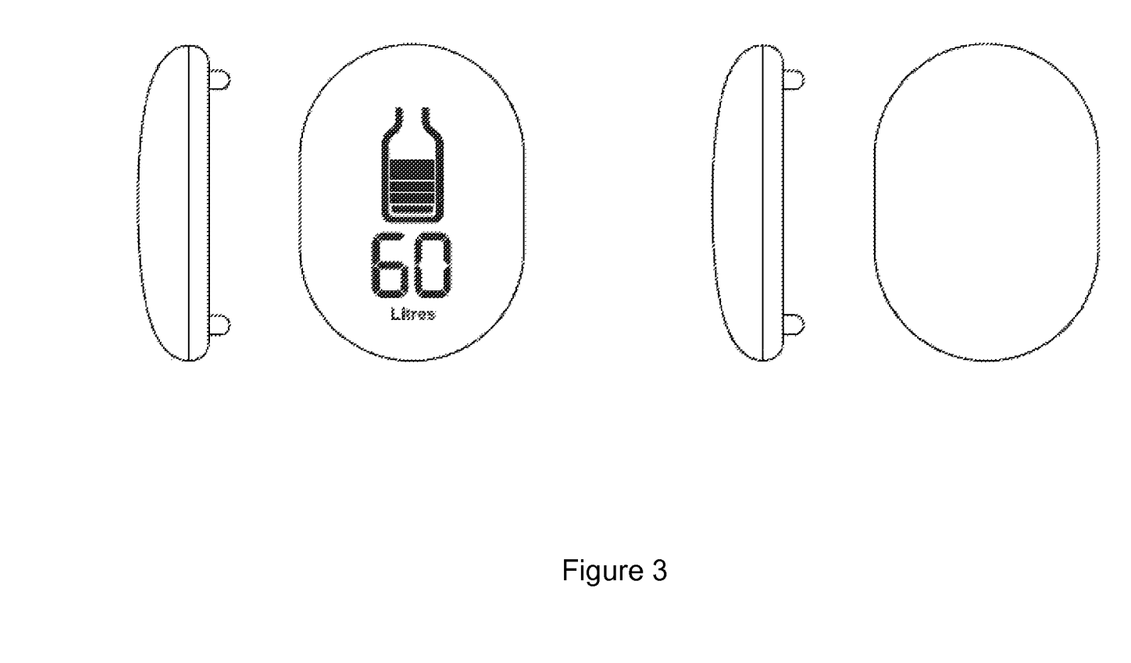
FIG. 3 shows a further embodiment of a device configured to be positioned in a sink for measuring and indicating water volume.

FIG. 3 shows an embodiment of the device comprising a numerical and graphical indication of water volume.

The detection device may comprise more than one liquid sensor, each disposed at a different position on the body of the device. Embodiments may be designed to roll or slide to the lowest point of the sink, and thus the orientation of the device in its working position is not known. The provision of more than one sensor can be utilised to ensure that whatever the orientation of the device, one of the sensors will be exposed to liquid flowing out of the sink and the device will therefore be activated.

The device may also comprise more than one indicator, such that the indicator will be visible regardless of the orientation of the device in the sink. The indicator may also be provided by the whole device, or a substantial portion of the device, illuminating.

The provision of more than one sensor may also allow the device to distinguish between water flowing directly out of the sink, and water that is being held in the sink due to the closure of the outlet. When water is flowing directly out of the sink, the water level will generally be very low, and thus only the sensors located at the lowest points of the device will detect the liquid. However, when the sink is being filled the water level will increase and the liquid will be detected by more than one of the sensors. It is one intention of the device to encourage users to fill sinks rather than utilise a running tap, and therefore the indication provided by the device may change when it is detected that the sink is being filled. For example, the indication of volume may stop increasing, or the colour of the indicator may change from a first warning colour to a second colour indicating that the correct action is being taken.

In an alternative embodiment the outer body of the device may be provided with openings such that liquid can enter the device. The liquid sensors may be located within the outer body and are thus protected from contact with other items, for example the sink in which the device is disposed. Contact of the liquid sensors with an object may cause activation of the sensors and hence inaccurate measurement of liquid flow. Location of the sensors within the body may thus increase the accuracy of the device. The electronic system is adequately packaged, for example by encapsulation, to prevent any damage by contact with the liquid.

In alternative embodiments a body shape which is designed to stay in one place may be utilised rather than the rolling-shape described above. For example, a cuboid body may be utilised and the device would then be positioned in the preferred location by the user. Such a device may also be provided with an attachment means to secure it in the desired location. Other than the body shape, the features described hereinbefore are equally applicable to this embodiment. A further embodiment utilises a tripod or other multi-legged shape such that the device rests in a defined position. The liquid sensors may be mounted in any suitable position on the legs or body of the device. The legs may be arranged such that the device is stable when positioned in a sink with a sloping side. The display may be positioned on the top of the device such that it can be easily viewed, or as described previously the body or legs may form the indicator.

In an alternative embodiment, the liquid sensor is mounted on an extension of the device, which extension is configured to extend into the plug hole or outlet of the sink, such that it protrudes below the plug. The extension may be constructed to be thin, such that the plug can still seal the outlet, in spite of the extension. The liquid sensor in this embodiment is only exposed to liquid when it is running out of the sink, and therefore a more accurate indication of wasted water may be gained. One or more liquid sensors may also be provided on the body of the device for operation in conjunction with the liquid sensor positioned in the outlet. The sensor on the body may be positioned such that it only detects liquid once it has reached a reasonable depth and thus indicates the sink is filling. Such a pair of sensors may allow discrimination between water flowing through the outlet due to an emptying of a sink of water and water being allowed to flow directly out of the sink. In the former case liquid will be detected by both sensors. The latter is more likely to indicate wasted water and the device may be configured to only monitor such flow. Sensors may also be provided to detect when the device is in contact with the bottom of the sink, or when it is floating, such that an alternative method of detecting when the sink is filling is provided.

Figure 4:
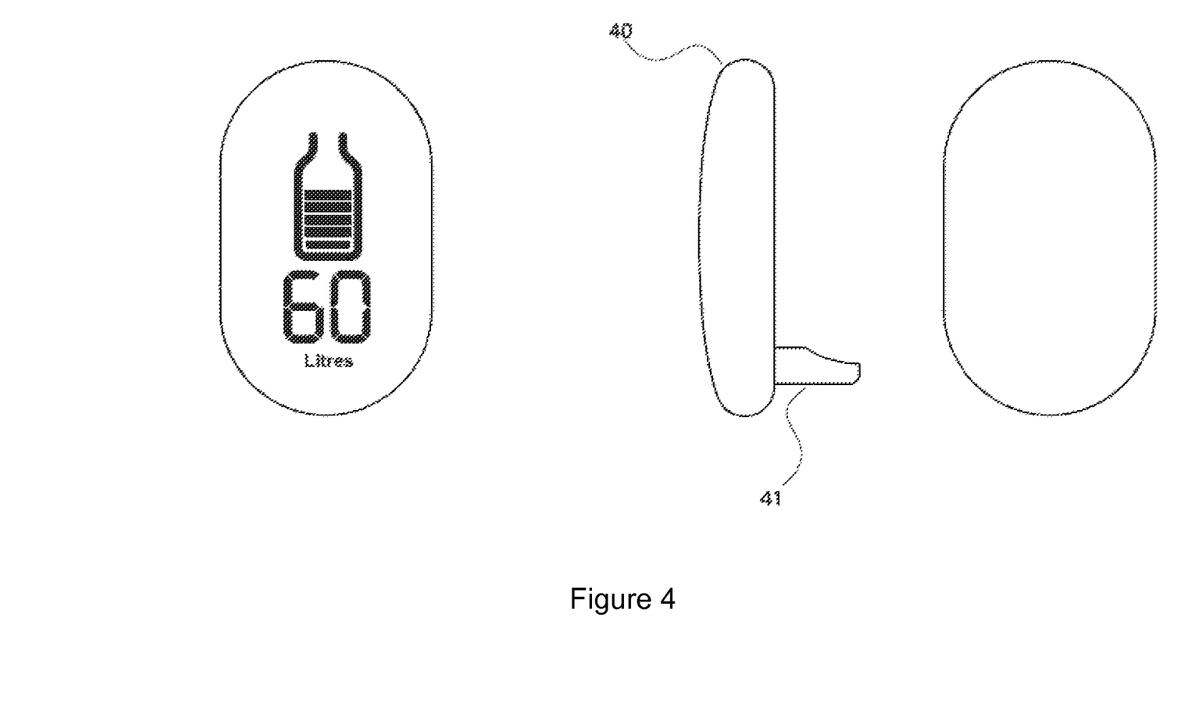
FIG. 4 shows an embodiment of a device configured to be attached to a tap for measuring and indicating water volume flowing out of that tap.

FIG. 4 shows an embodiment 40 for mounting on the outlet of a tap. This embodiment monitors the flow of water into the sink, rather than out of it. The device has an attachment means for attaching to a variety of designs of tap, and a sensor 41 which protrudes into the water flow to detect the presence of water. When water is detected by the sensor 41, the device records and indicates volumes as described hereinbefore. In an alternative embodiment, water may be sensed using an optical sensor, so that no contact with the water is required. Such a sensor may be advantageous as any material brought into contact with water which may be consumed must meet rigorous safety standards. The optical sensor may operate in a reflective or transmissive mode.

Figure 5:
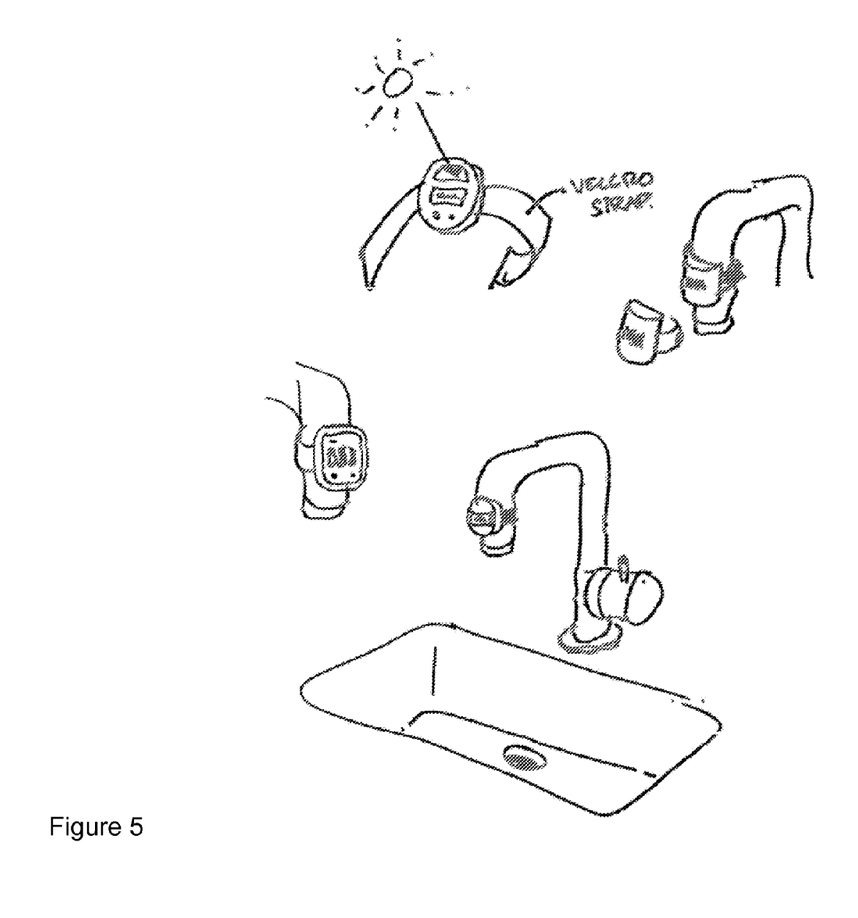
FIG. 5 shows a further embodiment of a device configured to be attached to a tap for measuring and indicating water volume flowing out of that tap.

FIG. 5 shows an alternative device utilising a hook-and-loop fastening strap to attach the device to the tap. The device is also provided with a solar panel such that the device can be powered without requiring batteries.

A method of calibration is also provided such that the accuracy of the device can be improved. To calibrate the device, it is set to a calibration mode and a predetermined volume of water is measured out of the tap. The device measures the time taken for that predetermined volume to be dispensed and utilises that time to calibrate measurements. When the calibration is performed, the tap is set to a typical flow-rate, and it is then assumed that the flow rate of the tap is consistent with that calibration flow-rate. Although the flow-rate in use will not always be a precise match for the calibration flow-rate, it has been shown to be sufficiently close to provide useful data. Furthermore, even if no calibration is performed, typical flow-rates of taps are relatively consistent and therefore the devices can be pre-calibrated for an average flow-rate that the device is likely to be utilised with.

The device may be supplied in a container that can be utilised to measure the predetermined volume of water for the calibration process. The liquid sensors may be utilised to change the mode of the device and to indicate when the predetermined volume measurements starts and stops.

A temperature sensor may also be provided in the device to detect the temperature of liquid coming in contact with the device. The device may be configured to monitor and/or indicate differently depending on the temperature of the water. For example, the device may therefore be configured to alert the user more rapidly when hot water is detected, or a specific indication may be provided that the water detected is hot (i.e. above a certain predefined temperature).

A capacitive sensor may be particularly appropriate for use as the liquid sensor.

Figure 6:
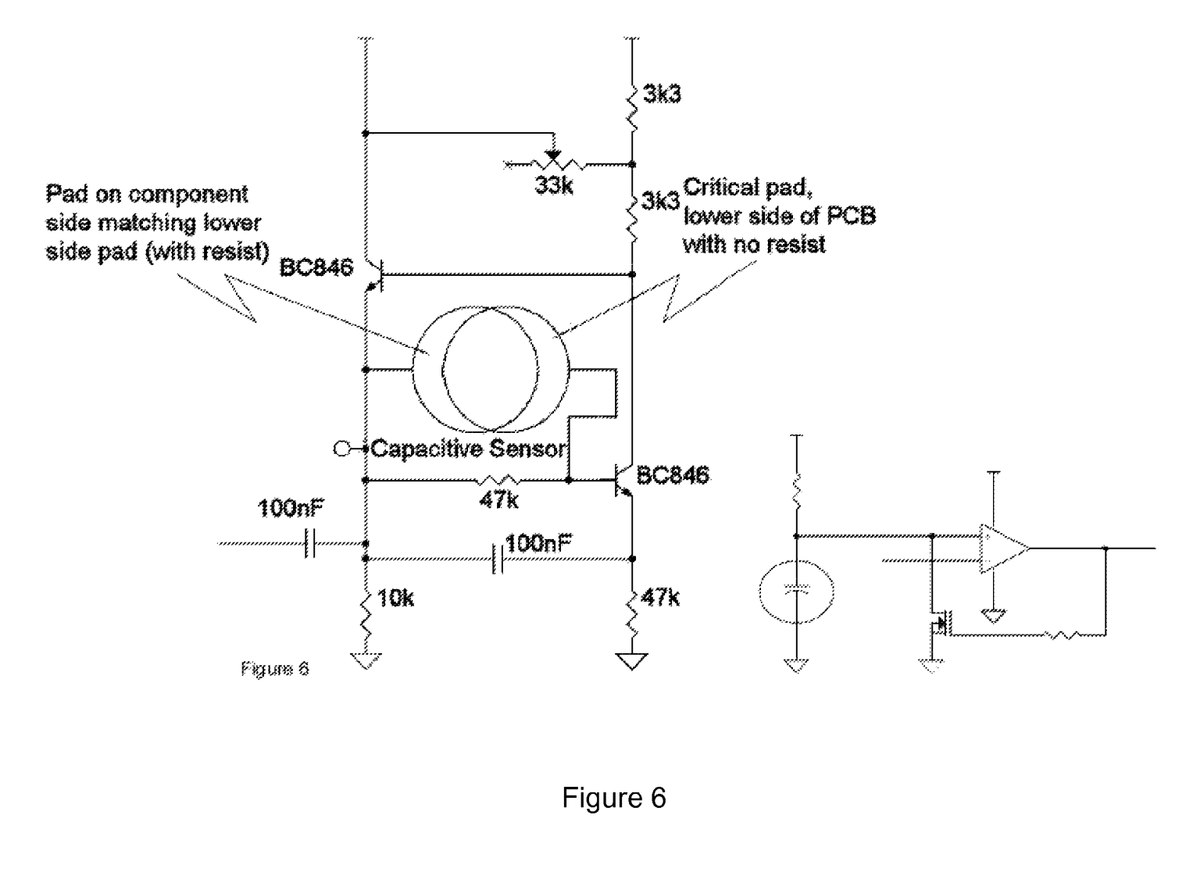
FIG. 6 shows schematic diagrams of suitable liquid sensors.

FIG. 6 shows two embodiments of capacitive sensors that may be utilised to detect liquid. In each sensor the presence of liquid modifies the electrical properties of the capacitor. That change is detected and utilised to indicate a presence of liquid.

In a further embodiment a device is provided to detect water flowing through a waste outlet from a bath or shower tray to determine the length of use of the shower. The time for which water flows out of the waste outlet is monitored, thereby providing a measurement of shower duration. An output is provided to give an indication of that duration. For example, the device may have green, amber, and red LEDs, which are illuminated in turn to indicate increasing shower duration. The green LED may illuminate initially, followed by the amber LED during an appropriate shower duration, followed by the re LED when the duration is excessive. As be appreciated various indication methods may be utilised, including coloured or flashing lights, and/or sound outputs.

The device may be configured to vary the time at which the different LEDs are illuminated to encourage a reduction in shower duration over time. For example, the first time the device is used a record may be kept of the shower duration. On subsequent usages the time after which the amber and red LEDs illuminate may be decreased, encouraging a reduction in shower time. Various patterns of change may be provided, for example a percentage reduction, or a reduction by a fixed number of seconds. A minimum duration at which the LEDs illuminate may be set such that the duration does not continue to reduce to an impractical level. The duration may remain the same if the shower is stopped after the red LED is illuminated, or may reduce if the shower is stopped before the red LED is illuminated.

The device may be configured to stop timing, but not reset the measured time, when a stop in water flow is detected, and then to restart timing when flow recommences.

This ensures the duration accounts for periods during a shower when the water flow is turned off, such that the device provides an indication of water usage, not only total shower duration from start to finish. This feature may encourage users to turn the shower off while applying soap, for example.

Figure 7:
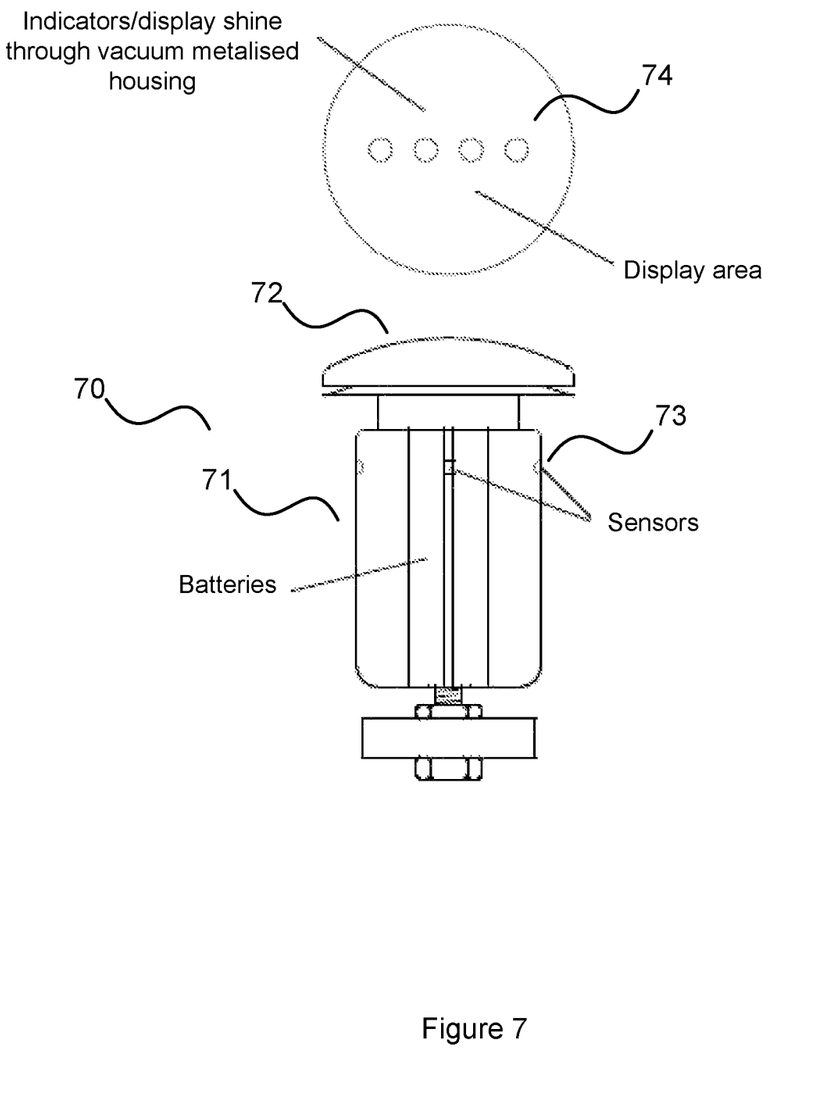
FIGS. 7 to 9 show embodiments for positioning in a waste outlet in place of a plug.

FIG. 7 shows a schematic diagram of a device for monitoring shower duration formed as a waste water outlet plug. The plug 70 has a leg portion 71 and a top portion 72. In use the leg portion 71 is positioned in the support structure of a waste water outlet to hold the plug at the required position. The waste water outlet may of the pop-up type such that a mechanism in the waste water outlet allows a user to open and close the outlet by movement of the plug.

A water sensor 73 is provided on the leg portion for detecting water flowing down the waste outlet in which the device is positioned. A display 74 is provided in the top surface of the top portion for indicating the time for which water has been detected. The display may be a set of coloured LEDs as described hereinbefore. A processing system and power supply are positioned within the plug 70 and in communication with the display and water sensor 73. For example, the power supply may be a battery positioned in the leg portion 71 and the processing system may be a microprocessor positioned in the top portion. The processing system is configured to implement the shower-duration monitoring method described above.

In use the processing system monitors the water sensor and when water is activated by the sensor commences timing and controls the display to provide an indication of elapsed shower time. For example, as described above using three different colours of LED. As described above the timings may be fixed or variable to encourage behaviour change.

As will be appreciated the display may comprise any of the types described hereinbefore, configured to display information as most appropriate. Also, the calibration and indication based on volume described previously may be utilised in preference to durations as described immediately above.

In an alterative design, the device may be provided in the form of a cover for a waste outlet, supported in a comparable way to the plug shown in FIG. 7, providing an aesthetic cover, but not functioning as a plug. The top part of the cover is typically significantly larger than the actual outlet to provide a pleasing appearance.

Furthermore, similar cross-section (i.e. T-shaped) shapes may be utilised to rest in a waste outlet grate, such that the device sits on top of the grate with the leg portion protruding through the grate to detect water flowing through the outlet covered by the grate. Each of these embodiments share the common cross-sectional T-shape of a top portion at one end of a leg portion.

In further embodiments a water sensor may be provided in the waste outlet, with a display unit positioned remotely in a convenient location. For example, a display may be incorporated into a part of the bath or shower tray, or in the wall of the bath or shower. Such a device provides the same functions as the other devices described herein.

As will be appreciated many modifications to the size and shape of the device are be possible to enable the functions described to be utilised with various designs of waste outlet and to accommodate aesthetic requirements.

Figure 8:
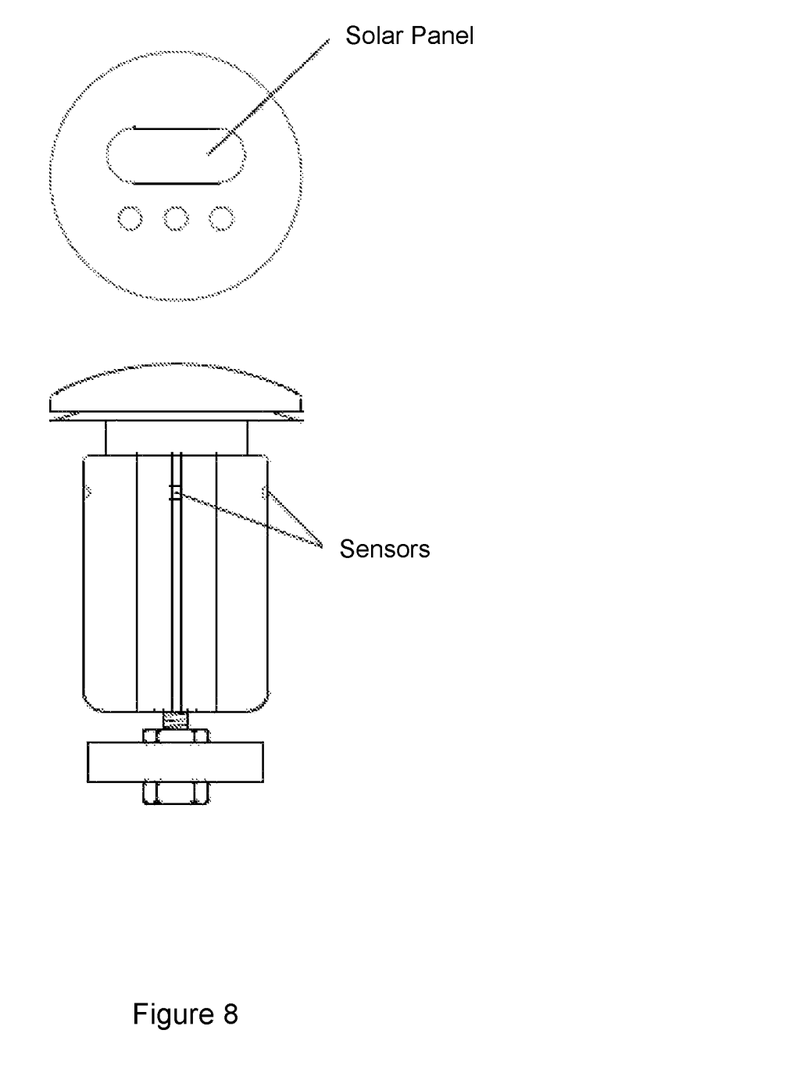

FIG. 8 shows an alternative embodiment including a solar panel to provide power for the device.

Figure 9:
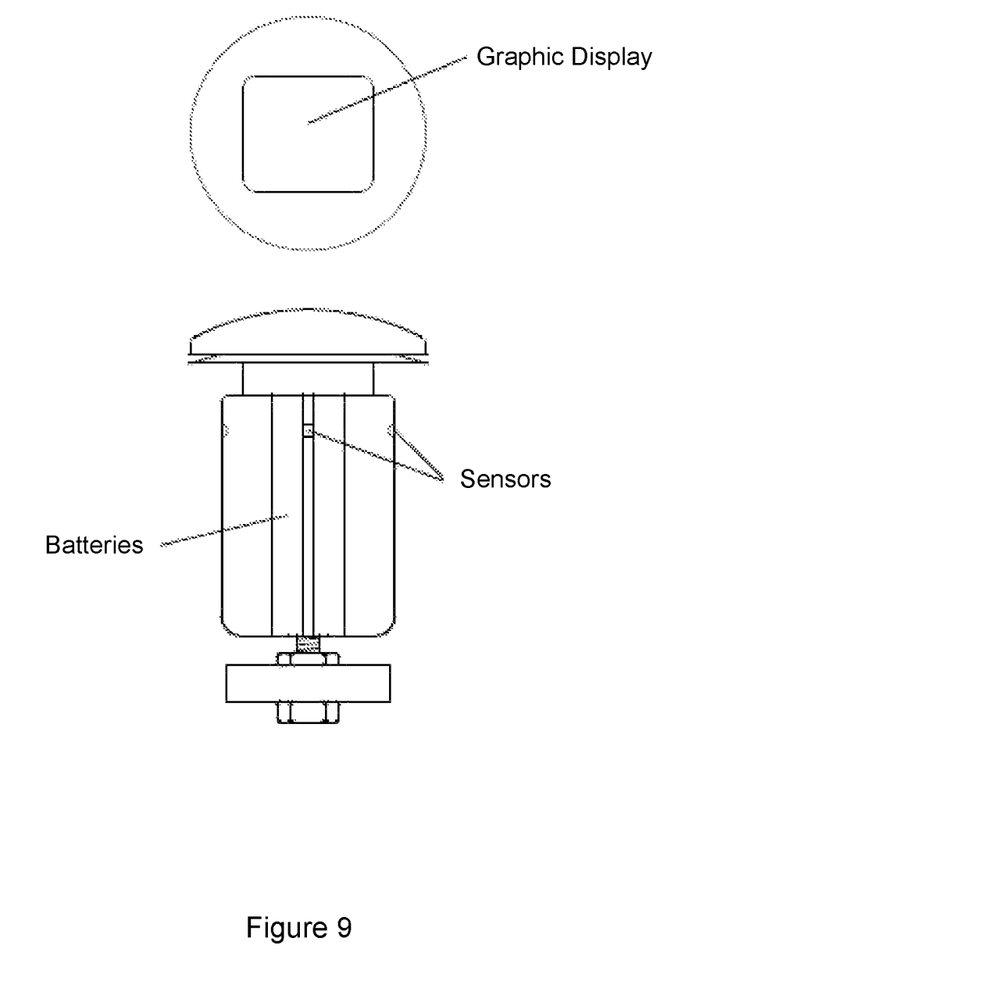

FIG. 9 shows an embodiment in which the display is a display panel position in the top part. The display panel may be, for example, an LCD panel.

Figure 10:
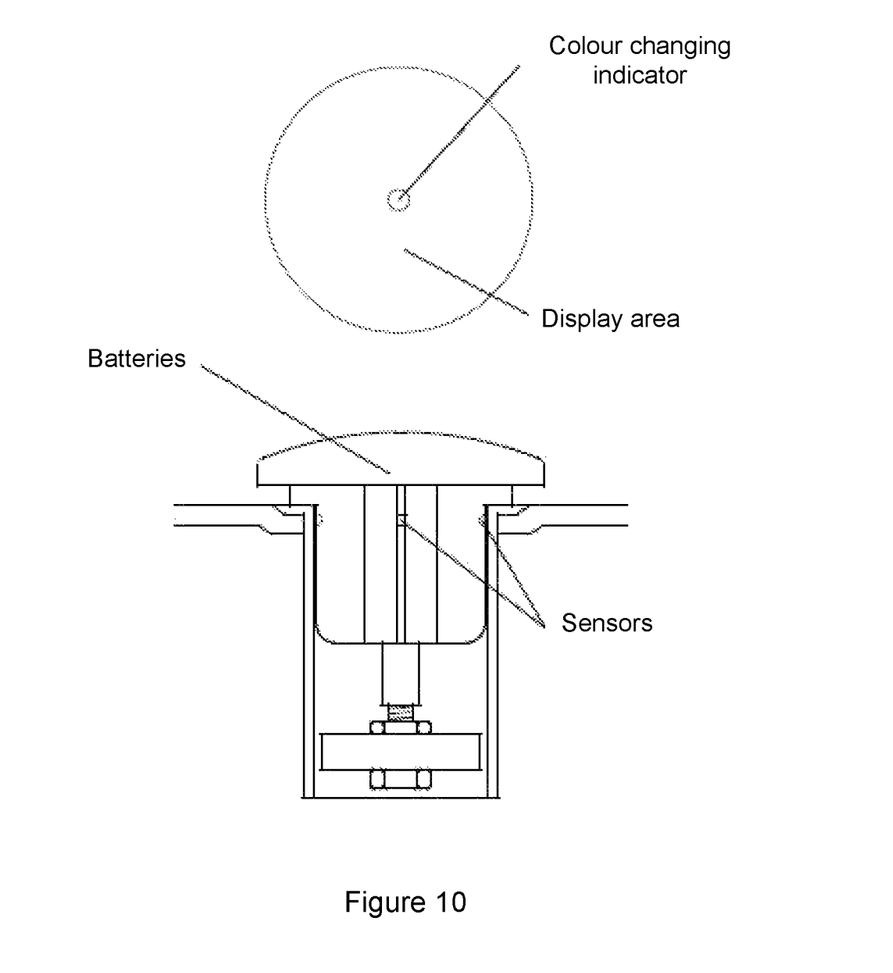
FIGS. 10 to 14 show embodiments for covering a waste outlet.

FIG. 10 shows an embodiment for use in a shower-only environment in which the device providers a cover for the waste outlet, but does not seal that waste outlet.

Figure 11:
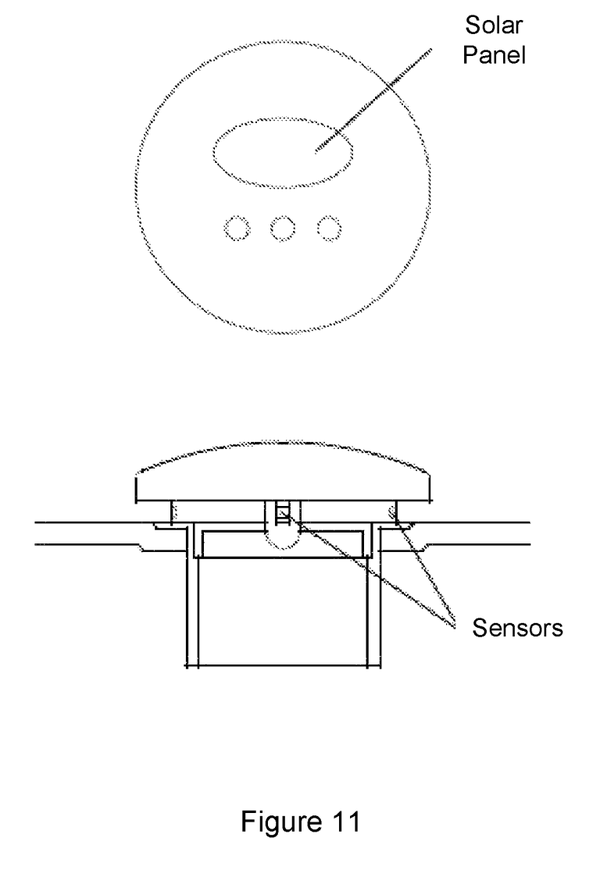
Figure 12:
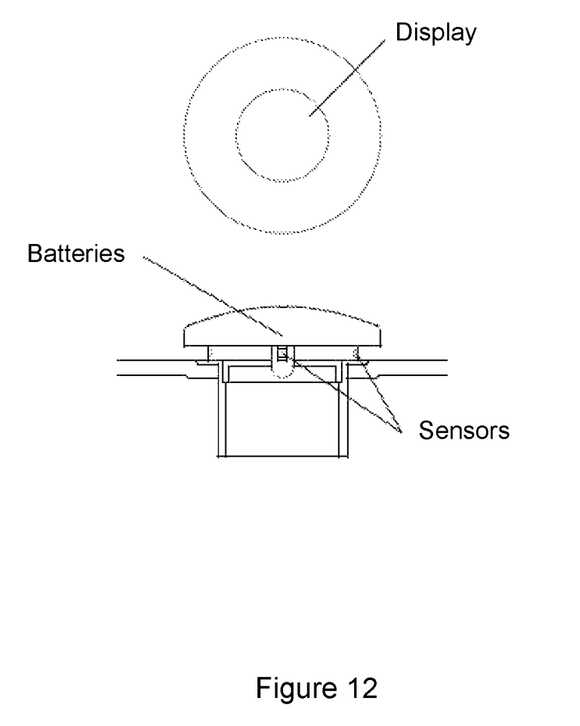
Figure 13:
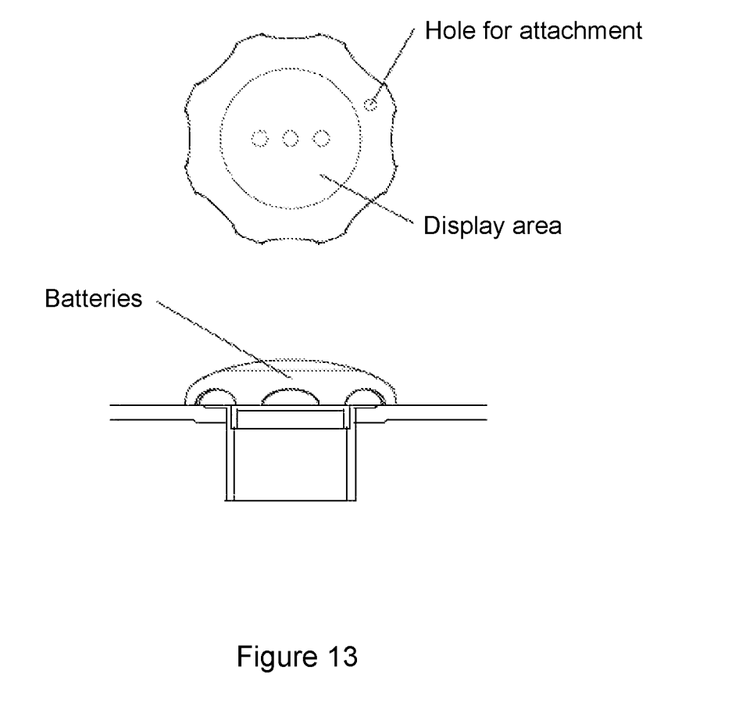
Figure 14:
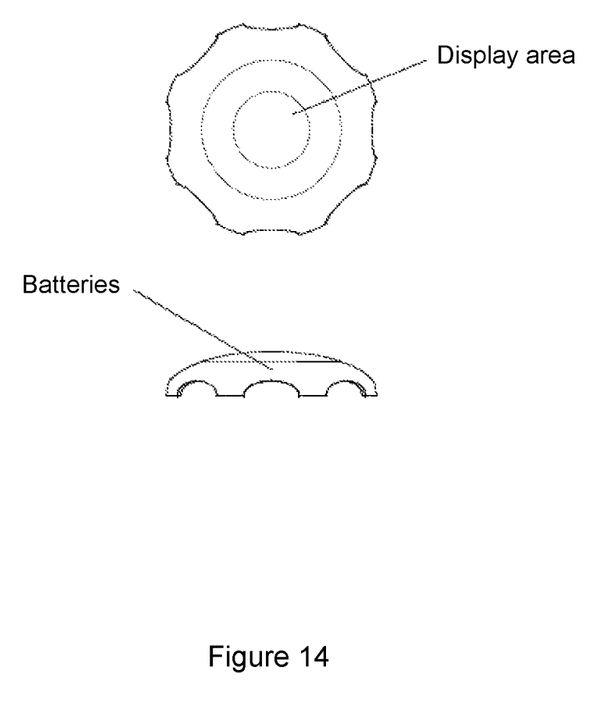

FIG. 11 shows a variation of the FIG. 11 embodiment in which the device is supported on the surface of the waste outlet. FIG. 12 shows a further variation with a display panel. FIG. 13 shows a further variation in which the device sits astride the waste outlet with openings to allow water flow into the waste outlet.

FIG. 12 shows a further variation of FIG. 13 with a display panel.

Figure 15:
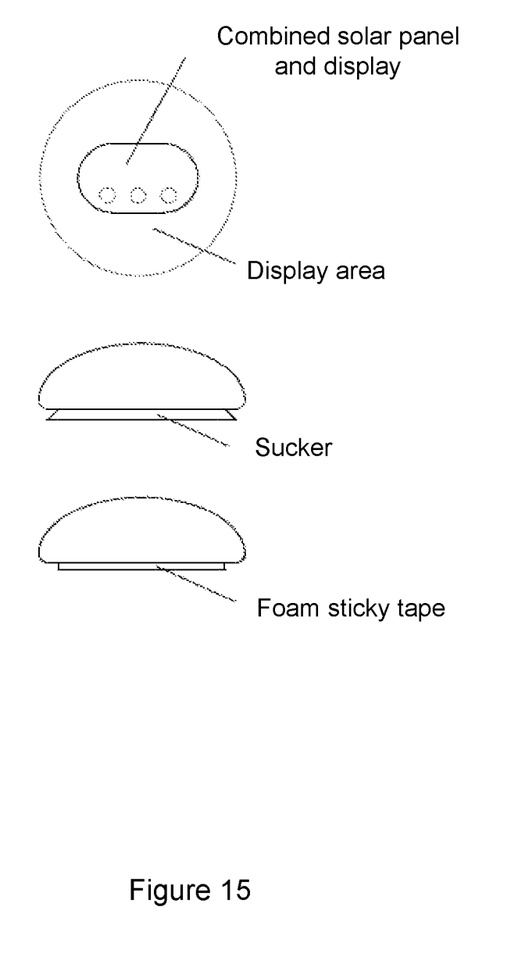
FIG. 15 shows an embodiment for attachment to a surface.

FIG. 15 shows a further variation with a suction pad for attachment to a surface.

The devices described hereinbefore may be secured in place using any suitable attachment means, for example suction cups, or self-adhesive materials. The devices which replace existing plugs or waste covers may be secured using the conventional mechanism which have the particular advantage of making theft more difficult and requiring no modification of the existing waste outlet.

The word 'sink' is used herein as a generic term to indicate any vessel into which water may be directed from a water outlet. References to sink are therefore intended to include other specific items such as baths and shower trays. Similarly, the term 'tap' is used to indicate any form of water outlet and accordingly encompasses items such as shower heads.

The methods described herein may be performed by software in machine readable form on a storage medium.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of this invention.

What is claimed is:

1. A water monitoring device for positioning in a waste water outlet, comprising
    a top portion connected to a leg portion, the leg portion being configured to, in use, protrude down a waste water outlet in which the device is positioned,
    the leg portion comprising a water sensor positioned to detect water flowing down the waste water outlet,
    a timer connected to the water sensor and configured to be activated while water is detected by the water sensor, and
    an output connected to the timer, wherein the output is configured to provide an indication of the period over which water has been detected.

2. A device according to claim 1, wherein the device is a plug and the top portion is configured to seal a waste water outlet in which the device is positioned.

3. A device according to claim 2, wherein the device is configured to supported by the leg portion such that it is movable between an open and a closed position.

4. A device according to claim 1, wherein the device is a waste water outlet cover configured such that the device is supported in a waste water outlet by the leg portion and such that the top portion covers, but does not seal, the waste water outlet.

5. A device according to claim 1, wherein the output is a visual display positioned in the top portion of the device.

6. A device according to claim 5, wherein the visual device comprises a plurality of light emitting devices.

7. A device according to claim 6, wherein the light emitting devices are configured to illuminate sequentially.

8. A device according to claim 1, comprising a power supply device located in the leg portion.

9. A device according to claim 1, wherein the timer is deactivated when water is not detected by the sensor, and wherein the period is the time during which the timer is activated.

10. A device according to claim 1, wherein the period is the total time elapsed from the timer starting, including periods when water is not detected.

11. A device according to claim 1, wherein the sensor is configured to detect hot water, but not cold water.

12. A device according to claim 1, wherein the timer is activated only if the temperature of the water exceeds a predetermined temperature.

13. A device according to claim 1, wherein the period is the time during which water over a predetermined temperature is detected.

* * * * *